United States Patent [19]

Yamamoto et al.

[11] Patent Number: 5,059,246
[45] Date of Patent: Oct. 22, 1991

[54] RECORDING LIQUID AND INK JET RECORDING PROCESS EMPLOYING IT

[75] Inventors: Takao Yamamoto, Isehara; Katsuhiro Shirota, Kawasaki, both of Japan

[73] Assignee: Canon Kabushiki Kaisha, Tokyo, Japan

[21] Appl. No.: 598,956

[22] Filed: Oct. 17, 1990

Related U.S. Application Data

[63] Continuation-in-part of Ser. No. 305,547, Feb. 3, 1989, abandoned.

[30] Foreign Application Priority Data

Feb. 9, 1988 [JP] Japan .................................. 63-029817
Jan. 24, 1989 [JP] Japan .................................... 1-14350

[51] Int. Cl.$^5$ ................................................ C09D 11/02
[52] U.S. Cl. ........................................ 106/22; 106/20
[58] Field of Search ................................... 106/20, 22

[56] References Cited

U.S. PATENT DOCUMENTS

| | | | |
|---|---|---|---|
| 4,239,543 | 12/1980 | Beasley | 106/22 |
| 4,279,653 | 7/1981 | Makishima et al. | 106/22 |
| 4,361,842 | 11/1982 | Haruta et al. | 106/22 |
| 4,396,429 | 8/1983 | Matsumoto et al. | 106/20 |
| 4,399,443 | 8/1983 | Yasufuku et al. | 106/22 |
| 4,409,040 | 10/1983 | Tabayashi et al. | 106/22 |
| 4,426,226 | 1/1984 | Onta et al. | 106/22 |
| 4,505,749 | 3/1985 | Kanekiyo et al. | 106/20 |
| 4,599,112 | 7/1986 | Yokoyama et al. | 106/22 |
| 4,627,875 | 12/1986 | Kobayashi et al. | 106/22 |
| 4,632,703 | 12/1986 | Koike et al. | 106/23 |
| 4,677,445 | 6/1987 | Haruta | 106/22 |
| 4,689,078 | 8/1987 | Koike et al. | 106/22 |

FOREIGN PATENT DOCUMENTS 2333844 7/1977 France .

OTHER PUBLICATIONS

Database Chemical Abstract, (Kost STN), 1987, No. 108 (22): 187490y, Columbus, OH; & JP-A-62 257931, 10-10-87.

*Primary Examiner*—William R. Dixon, Jr.
*Assistant Examiner*—Helene Klemanski
*Attorney, Agent, or Firm*—Fitzpatrick, Cella, Harper & Scinto

[57] ABSTRACT

A recording liquid comprising a coloring material and a liquid medium containing water and a water-soluble organic solvent having an ether bond, and a pH value of said recording liquid being from 3 to 9 and a peroxide concentration of the liquid medium being not more than 4 mmol/l in terms of iodine is provided. And also an ink-jet recording process that performs recording by ejecting the recording liquid in the form of droplets from a minute ejection orifice, to a recording medium by the action of heat energy, is provided.

62 Claims, 3 Drawing Sheets

RECORDING LIQUID AND INK JET RECORDING PROCESS EMPLOYING IT

This application is a continuation-in-part of patent application Ser. No. 305,547, filed on Feb. 3, 1989, now abandoned.

BACKGROUND OF THE INVENTION

1. Field of the Invention

The present invention relates to a recording liquid particularly suited to ink-jet recording systems in which recording is performed by ejecting ink droplets from a minute ejection opening (or ejection orifice) provided in a recording head, and an ink-jet process that employs it.

2. Related Background Art

Hitherto known as inks used in writing utensils such as felt pens and fountain pens are those comprising a dye or pigment which serves as a coloring material, dissolved or dispersed in water, and an organic solvent or a mixture of these which serves as a medium. It is also known to add surface active agents, humectants, mildewproofing agents, viscosity modifiers, pH adjusters, etc. therein.

The inks as mentioned above are known to be used also in ink-jet recording systems in which recording is performed by forming and flying ink droplets from an ejection orifice by using mechanical energy, electrostatic energy or heat energy, and adhering on a recording medium.

Preferable performances of ink-jet recording liquids include the following:

(1) The recording liquids can be stably stored for a long period of time, and do not cause clogging;

(2) they have liquid properties such as viscosity, surface tension, and conductivity fitted to ejection conditions such as shapes of the orifice, materials, and drive frequencies;

(3) they may not form any deposits around the cross section of the ink flow path or ejection orifice and may not change the flying course of droplets;

(4) they may not attack surrounding materials;

(5) they may not be irritative to human bodies;

(6) they have an excellent safety against smell, toxicity and flammability;

(7) they can be readily fixed to the recording medium and can give rich smoothness and less feathering to the peripheries of dots;

(8) they can give a sharp printed image; and (9) they can give a printed image having excellent water resistance and light-resistance.

In particular, in the system in which the droplets are formed by using heat energy, a matter of importance is the phenomenon that deposits are formed around the cross section of the ink flow path or ejection orifice in the course of the ejection of ink. Once the deposits are formed on a heat energy source or in the vicinity thereof, it may occur that they suppress the heat energy from being effectively transmitted, make unstable the generation of bubbles which are the source of ejection force, or divert the flying course from the desired course. As a result, it may follow that prints cannot be obtained with sharpness, or, in an extreme instance, droplets can not be ejected. This is the reason why there is a demand for recording liquids that may not form any deposits in the vicinity of the heat energy source.

Commonly available ink-jet recording liquids are mainly composed of a water-soluble dye as a coloring material, water, a water-soluble organic solvent (such as diethylene glycol and polyethylene glycol), and contain besides these a small amount of organic or inorganic impurities. Various proposals to decrease the deposits have been made on such recording liquids from the respective standpoints.

For example, U.S. Pat. No. 4,396,429 discloses a recording liquid in which the content of m-phenylenediamine in ink has been controlled to not more than 1,000 ppm, and U.S. Pat. No. 4,435,717 discloses a recording liquid containing a dye having no amino group.

Such recording liquids, however, certainly do not form any deposits on thermally affected surfaces when used shortly after they have been prepared, but apparently form deposits when used after they have been stored for a long period of time, bringing about difficulty in ejection.

SUMMARY OF THE INVENTION

Accordingly, an object of the present invention is to provide a recording liquid that does not form any deposits in the vicinity of the heat energy source in ejecting the recording liquid even when used after the recording liquid has been stored for a long period of time, or forms deposits, only to such a degree that the formation does not adversely affect the ejection of the recording liquid.

Another object of the present invention is to provide a recording liquid that can suppress an increase in the hydrogen ion concentration (pH) of recording liquids, thereby increasing the dissolution stability of the substances dissolved in recording liquids, and has a superior long-term storage stability.

Still another object of the present invention is to provide a recording liquid superior also with respect to the irritability to human bodies because the dissolution stability is not caused by increasing the pH.

A further object of the present invention is to provide a recording solution that can suppress color change or color fading caused by irradiation of light during storage.

The above objects can be achieved by the present invention described below. Namely, the present invention provides a recording liquid comprising a coloring material and a liquid medium containing water and a water-soluble organic solvent having an ether bond, and a pH value of the recording liquid is from 3 to 9, and a peroxide concentration of the liquid medium is not more than 4 mmol/l in terms of iodine. It also provides an ink-jet recording process that performs recording by ejecting said recording liquid in the form of droplets from a minute ejection orifice, to a recording medium by the action of heat energy.

The present inventors have made various studies on recording liquids that do not form any deposits in the vicinity of the heat energy source in an ink-jet printer head, and finally found that a solvent having an ether bond, contained in ink as a wetting agent, undergoes decomposition in part by the action of oxygen in the air to turn into a peroxide, which peroxide is responsible for the deposits to be formed. The present invention has thus been accomplished.

The deposits ascribable to such a peroxide are particularly remarkably formed when the ink is used after it has been stored for a long period of time rather than shortly after it has been prepared.

DETAILED DESCRIPTION OF THE PREFERRED EMBODIMENTS

The present invention will be described below in detail.

Dyes used as the coloring material in the recording liquid of the present invention may preferably be those thermally stable, and suitably be water-soluble dyes having a small number of amino groups (not more than 2), as typified by direct dyes, acid dyes, basic dyes and reactive dyes. Specifically, it includes, for example, C.I. Direct Black 17, 32, 51 and 71; C.I. Direct Blue 6, 22, 25, 71, 86, 90, 106 and 199; C.I. Direct Red 1, 4, 17, 28 and 83; C.I. Direct Yellow 12, 24, 26 and 86; C.I. Direct Orange 34, 39, 46 and 60; C.I. Direct Violet 47 and 48; C.I. Direct Green 59; C.I. Acid Black 2, 7, 24, 26, 31, 52 and 63; C.I. Acid Blue 9, 22, 40, 59, 93, 102, 104, 113, 117 and 120; C.I. Acid Red 1, 6, 32, 35, 37, 51, 52, 80, 85, 87, 92, 94, 115 and 180; C.I. Acid Yellow 11, 17, 23, 25, 29 and 42; C.I. Acid Orange 7 and 19; C.I. Acid Violet 49; C.I. Basic Black 2; C.I. Basic Blue 1, 3, 5, 7, 9, 24, 25 and 26; C.I. Basic Red 1, 2, 12 and 13; C.I. Basic Violet 7; and C.I. Food Black 2. The above dyes are particularly preferred in the present invention, but in the present invention the dye is by no means limited to these.

Among the above water-soluble dyes, conventional recording liquids containing C.I. Direct Yellow 86 or C.I. Direct Blue 199 have a tendency to cause color change or fading of images when prints are made on coated paper, but by the recording liquid of the present invention the problem of such color change or fading can unexpectedly also be solved, even if such dyes are employed.

The above water-soluble dyes are commonly used in the proportion of about 0.5 to 15% by weight in ink.

The liquid medium used in the recording liquid or ink composition of the present invention may preferably contain a mixed solvent comprising water and a water-soluble organic solvent having an ether bond.

The water-soluble organic solvent having an ether bond is particularly useful as a solvent capable of preventing ink to clog a nozzle tip.

Such a water-soluble organic solvent includes polyalkylene glycols such as polyethylene glycol and polypropylene glycol; alkylene glycols comprising an alkylene group having 2 to 6 carbon atoms, such as diethylene glycol, propylene glycol, butylene glycol, triethylene glycol, 1,2,6-hexanetriol, thiodiglycol and hexylene glycol; and lower alkyl ethers of polyhydric alcohols, such as ethylene glycol methyl(or ethyl) ether, diethylene glycol methyl(or ethyl) ether, triethylene glycol monomethyl(or -ethyl) ether, and polyethylene glycol methyl (or -ethyl) ether.

In the present invention, the above water-soluble organic solvent is contained as an essential component, but additionally usable are alkyl alcohols having 1 to 4 carbon atoms, such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones or keto-alcohols such as acetone and diacetone alcohol; and N-methyl-2-pyrrolidone, 1,3-dimethyl-2-imidazolidinone, etc.

The above water-soluble organic solvent in the ink may be contained generally in the range of from 5 to 95% by weight, preferably from 10 to 80% by weight, and more preferably from 10 to 50% by weight, based on the total weight of the ink.

The content of water in this occasion may be selected in a wide range, depending on the type of the above solvent component, composition thereof, or desired ink properties, but may be generally in the range of from 10 to 95% by weight, preferably from 10 to 80% by weight, and more preferably from 20 to 70% by weight, based on the total weight of the ink.

In the ink composition prepared to have a pH of from 3 to 9 under the above compositional conditions, methods of lowering the peroxide concentration in the liquid medium include a method in which the peroxide is removed using an adsorption material, a method in which it is removed using a column chromatography, and a method in which an inert gas is filled after any of the above treatment has been applied. A simplest method, however, is the method in which the column chromatography is used. The object can also be achieved by using these methods in combination.

The recording liquid may be prepared by a method in which the coloring material is dissolved or dispersed in a solvent (a medium such as water or an organic solvent in which the coloring material can be dissolved or dispersed) having been controlled to have the peroxide concentration within the above range, or a method in which the coloring material is dissolved or dispersed and thereafter the peroxide concentration is controlled.

The peroxide concentration can be measured by using an iodine titration method, a polarography, an absorptiometric method, a high speed liquid chromatography, etc. [BUNSEKI KAGAKU BENRAN (Handbook of Analytical Chemistry), Maruzen Co., Ltd., 1981, pp. 446–448], but by using the absorptiometric method or the iodine titration method with convenience.

More specifically, a typical method for measuring the peroxide concentration of a liquid medium containing no coloring material is as follows: a sample solution is put in a sealed container, and stored at 70° C. for 24 hours in the dark, thereafter dispensing 1 ml of the stored solution into a test tube with a capacity of 10 ml, passing nitrogen gas through the solution for 5 minutes to carry out deaeration, and thereafter adding therein 1 ml of an aqueous 20% potassium iodide, which is left to stand for 1 hour in the dark to thereafter measure the absorbance at 355 nm. The peroxide concentration is calculated from a calibration curve beforehand prepared. As a matter of course, some modification of the treatment procedures may become necessary in regard to what quantity of sample solution is used, whether extraction must be made or not, and so forth, depending on what concentration of peroxide is present, whether the solution is water-soluble or not water-soluble, and so forth. Absorbance measurement wavelengths may also vary depending on the solvent, extraction solvent, etc., as so described in the literature.

In the case when the liquid medium contains the coloring material, the coloring material must be separated by any means. In the present invention, a method is used in which a neutral salt is added to precipitate the dye. A typical method comprises storing a sample solution at 70° C. for 24 hours in the dark, thereafter dispensing 5 ml of the stored solution, adding therein 5 ml of a saturated aqueous sodium chloride solution, which is left to stand for 1 hour, thereafter removing the precipitated dye with a filter paper (5C, available from Advanteck Co.), followed by washing with 5 ml of a saturated aqueous sodium chloride solution, and combining the wash liquid and filtrate together to make a filtrate. Nitrogen gas is passed through a half amount of the filtrate to effect deaeration, followed by addition of 2 ml of an aqueous 20% potassium iodide solution, and the resulting mixture is left to stand for 1 hour in the dark. The whole volume is regulated to 10 ml, and thereafter the absorbance at 355 nm is measured. In the case when extraction using an organic solvent is required, the extraction is carried out before measuring the absorbance. Chloroform, for example, is used as the extracting solvent. The same operation is repeated on the remaining half amount of the filtrate, except that water is added in place of the aqueous potassium iodide. The peroxide concentration is calculated from the difference between the former and the latter. It may become necessary as a matter of course to change the quantity of the sample solution or to carry out dilution or concentration, depending on what concentration of peroxide is present.

The peroxide concentration is calculated from a calibration curve beforehand prepared. The peroxide concentration in preparing the calibration curve is determined by an iodine titration method [BUNSEKI KAGAKU BENRAN (Handbook of Analytical Chemistry), Maruzen Co., Ltd., 1981, pp. 446–448]. Actual procedures for the operation are taken according to the method shown in BUNSEKI KAGAKU JIKKEN (Analytical Chemistry Experiments), edited by Japan Analytical Chemistry Society, Hokkaido Branch, Kagaku Dojin Co., 1971, p. 144. Reagents used in the titration are prepared according to the method described in KAGAKU BENRAN KISOHEN II (Handbook of Chemistry, Basic Edition II), Maruzen Co., Ltd., 1975, pp. 1524–1525. The absorbance is measured with Hitachi Automatic Recording Spectrophotometer, Type U-3200, using a quartz cell with an optical path length of 1 cm.

In this way, the peroxide concentration in the liquid medium of the recording liquid is controlled to not more than 4 mmol/l, preferably not more than 3 mmol/l, and more preferably not more than 2 mmol/l, in the terms of iodine, respectively, so that the recording liquid can be superior in the long-term storage stability, and moreover, even if it is used after having been stored for a long period of time, can be superior in the ejection stability and ejection response when used in ink-jet printers in which heat energy is used as the droplet ejection source, being and is almost free from any deposits formed in the vicinity of the heat energy source during use.

In the present invention, the above performance can be improved by further adding 0.001 to 0.1% of a water-soluble antioxidant as exemplified by hydroquinone or methoquinone.

The recording liquid of the present invention, prepared from the components described above is by itself a superior recording liquid well balanced in all the recording performances (such as signal response, droplet formation stability, ejection stability, a long-time continuous recording performance, and ejection stability after a long-time stop of recording), storage stability, and fixability to recording mediums, or the light-resistance, weathering resistance, and water resistance. To further improve these performances and properties, conventionally known various additives may be further added and incorporated, which include, for example, viscosity modifiers such as polyvinyl alcohol, celluloses, and water-soluble resins; all sorts of cationic, anionic or nonionic surface active agents; surface tension modifiers such as diethanolamine, and triethanolamine; and pH adjusters such as buffer solutions.

The recording liquid of the present invention, thus obtained, has solved the problems involved in the prior art, and is suited as ink used a the system apt to be easily damaged by the deposits formed in the vicinity of the heat energy source, i.e., the ink-jet recording system in which the droplets are ejected by using heat energy.

Such a recording liquid can also be suitably used in other ink-jet recording systems or in stationery.

The recording liquid of the present invention is preferably used in the ink jet recording method in which ink droplets are ejected by employing thermal energy. However, the recording liquid can also be used for general writing utensils.

An example of the recording printers which are preferable for recording by using the ink of the present invention is a printer in which ink droplets are produced by applying heat energy to the recording liquid in the chamber of a recording head in correspondence with a recording signal.

Figure 1A:
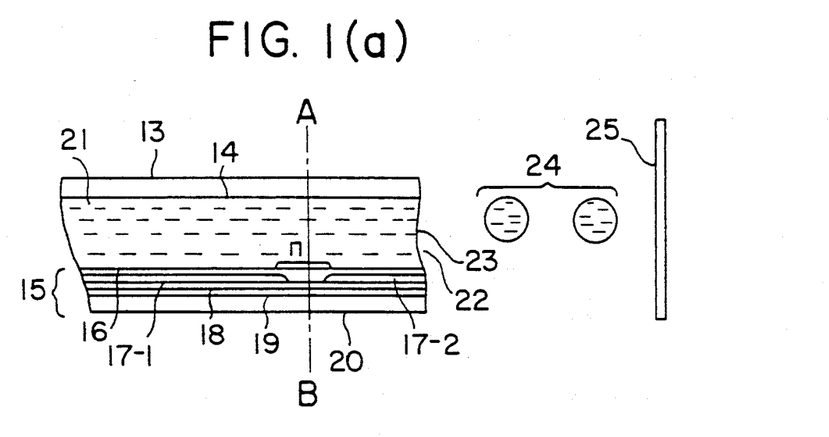
FIGS. 1(a) and 1(b) are respectively a longitudinal sectional view and a cross-sectional view of the head part of an ink jet recording device.
Figure 1B:
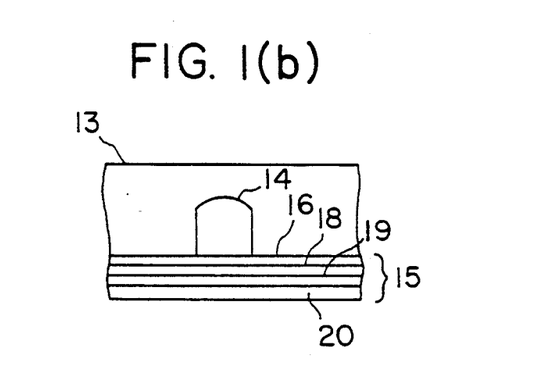
Figure 2:
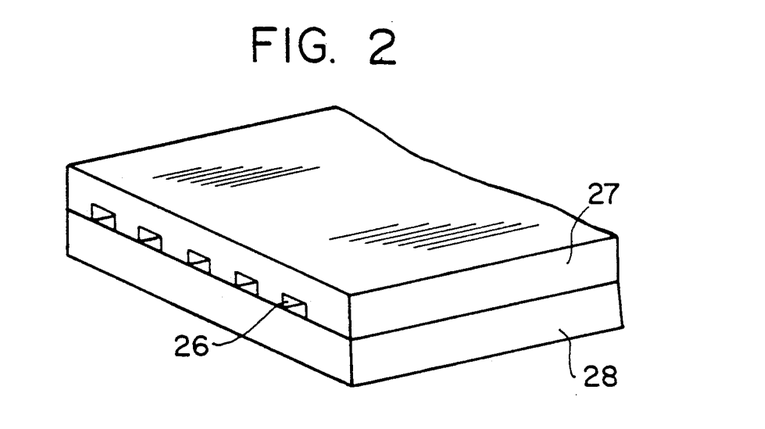
FIG. 2 is a perspective view of the appearance of a multiple head which comprises the head shown in FIG. 1.

FIGS. 1(a), 1(b) and 2 show examples of the structure of a head, which is a principal part of an ink jet recording apparatus.

In the drawings, a head 13 is formed by bonding a glass, ceramic or plastic plate, which has a groove 14 for allowing ink to pass therethrough, and a heating head 15 used for heat-sensitive recording. (Although a thin film head is shown in the drawings, the head is not limited to such embodiment.) The heating head 15 comprises a protective film 16 made of silicon oxide or the like, aluminum electrodes 17-1, 17-2, a heating resistor layer 18 made of nichrome or the like, a heat-accumulating layer 19 and a substrate 20 made of aluminum or the like and having good heat radiation properties.

Ink 21 reaches a jetting orifice (micropore) 22 and forms a meniscus 23 at pressure P.

When an electrical signal is applied to the electrodes 17-1, 17-2, a region off the heating head 15, which is denoted by n, rapidly generates heat so as to generate air bubbles in the ink 21 which contacts with the region. The meniscus 23 is projected by the pressure generated, and the ink 21 is ejected as a jet of ink droplets 24 from the orifice 22. The droplets 24 are propelled toward a recording material 25. FIG. 2 shows a multiple head comprising a plurality of the heads shown in FIG. 1(a) which are arranged in parallel. The multi-head is formed by bonding a glass plate 27 having a plurality of grooves 26 and a heating head 28, which is the same as that shown in FIG. 1(a).

FIG. 1(a) is a sectional view taken along the ink flow channel of the ink, and FIG. 1(b) is a sectional view taken along the line A-B in FIG. 1(a).

Figure 3:
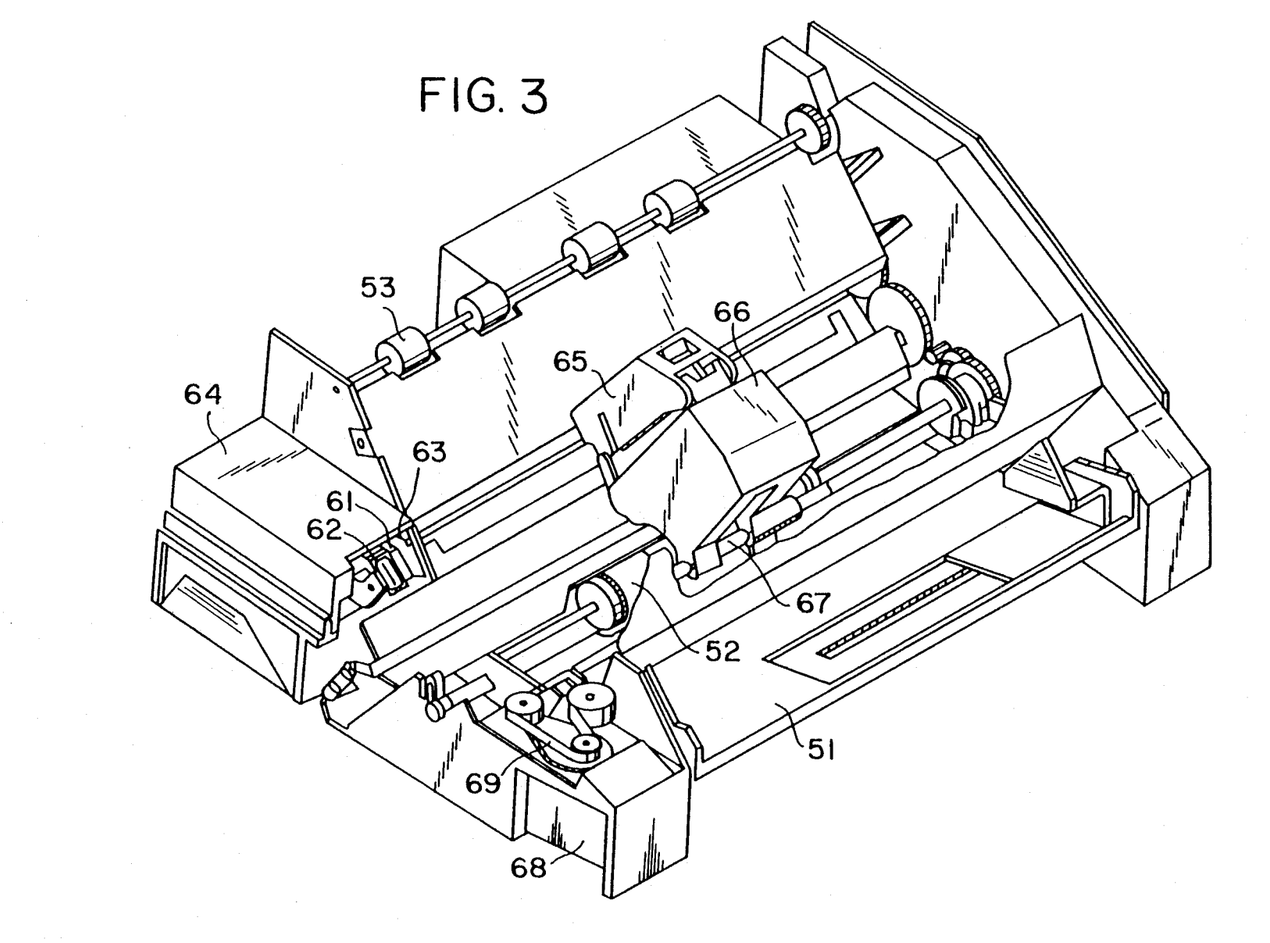
FIG. 3 is a perspective view of an example of an ink jet printer.

FIG. 3 shows an example of an ink jet printer in which the head shown in FIG. 1 is incorporated.

In FIG. 3, reference numeral 61 denotes a blade serving as a wiping member in the form of a cantilever in which one end is fixed and held by a blade holding member. The blade 61 is disposed at a position adjacent to a region of recording by a recording head. In this example, the blade 61 is held in a position in which it projects in the path of the movement of the ink jet device. Reference numeral 62 denotes a cap which is disposed at a home position adjacent to the blade 61 and which is moved in the direction vertical to the moving direction of the recording head so as to contact with the nozzle surface for the purpose of capping. Reference numeral 63 denotes an ink absorber which is disposed at a position adjacent to the blade 61 and which is held in a position in which it projects in the path of the movement of the ink jet device in the same way as the blade 61. The blade 61, the cap 62 and the absorber 63 form an ejecting recovery part 64. Moisture and dust on the ink orifice surface are removed by the blade 61 and the absorber 63.

Reference numeral 65 denotes the ink jet device which has a means for generating ejecting energy so as to record an image by discharging the ink to the recording material opposite to the orifice surface having orifices. Reference numeral 66 denotes a carriage for moving the ink jet device 65 which is loaded thereon. The carriage 66 is slidably engaged with a guide shaft 67 and is partially connected (not shown) to a belt 69 which is driven by a motor 68. This permits the carriage 66 to move along the guide shaft 67 and move in the region of recording by the ink jet device 65 and the region adjacent thereto.

Reference numeral 51 denotes a sheet feeding part, and reference numeral 52 denotes a sheet feeding roller which is driven by a motor (not shown). This arrangement allows the recording paper to be fed to a position opposite to the orifice surface of the recording head and to be delivered to a take-off part having a take-off roller 53 during the progress of recording.

In the aforementioned arrangement, when the ink jet device 65 is returned to the home position at the end of recording, the cap 62 is retracted from the path of movement of the ink jet device 65, while the blade 61 is projected in the path of movement. As a result, the nozzle surface of the ink jet device 65 is wiped by the blade 61. When the cap 62 contacts with the nozzle surface of the ink jet device 65 so as to cap it, the cap 62 is moved so as to project in the path of movement of the ink jet device 65.

When the ink jet device 65 is moved from the home position to the recording start position, the cap 62 and the blade 61 are at the same positions as the above-described positions in wiping. As a result, the nozzle surface of the ink jet device 65 is wiped even during the movement of the ink jet device 65.

The ink jet device 65 is moved to the home position adjacent to the recording region not only at the end of recording and during the recovery of ejecting (an aspirating operation of the ink from the orifice in order to normalize the ejection of ink from the orifice), but also at predetermined intervals when it is moved in the recording region for the purpose of recording. This movement causes the above-described wiping.

Figure 4:
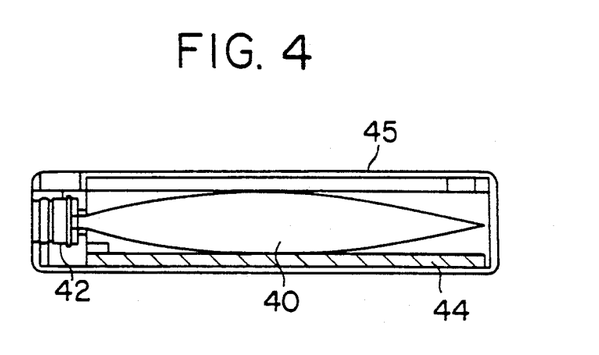
FIG. 4 is a longitudinal sectional view of an ink cartridge.

FIG. 4 is a drawing which shows an example of an ink cartridge 45 for containing the ink to be supplied to the head through an ink supply tube. In the drawing, reference numeral 40 denotes an ink bag for containing the ink to be supplied which has a rubber stopper 42 at its one end. When a needle (not shown) is inserted into the stopper 42, the ink contained in the ink bag 40 can be supplied to the ink jet device 65. Reference numeral 44 denotes an ink absorber for absorbing waste ink.

An ink bag where the surface contacting with the ink is comprised of polyolefin, particularly polyethylene is suitable for the ink bag for the present invention.

The ink jet printer used in the present invention is not limited to a printer in which a device and an ink cartridge are separately disposed, as described above. The ink jet device shown in FIG. 5 in which a device and an ink cartridge are integrated can be preferably used in the present invention.

Figure 5:
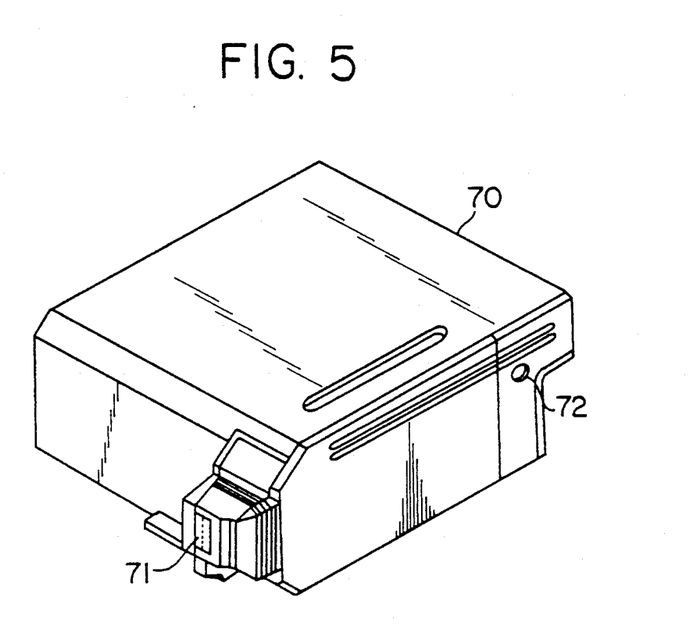
FIG. 5 is a perspective view of an ink jet device.

In FIG. 5, reference numeral 70 denotes an ink jet device which contains an ink storing member impregnated with ink. The ink in the ink storing member is ejected as ink droplets from a head part 71 having a plurality of orifices.

Further, the ink storing member may be either an ink absorber or ink bag. Further, the head is the same as described in FIGS. 1 and 2.

Reference numeral 72 denotes a communicating hole for allowing the inside of the device 70 to communicate with the atmosphere. Polyurethane is suitable for the material of the ink absorber.

The ink jet device 70 is used in place of the ink jet device 65 shown in FIG. 3 and is detachably provided on the carriage 66.

EXAMPLES

The present invention will be further described below by Examples. In the following, "part(s)" or "%" is by weight. The pH of the recording liquid was measured by means of a pH meter (Type 10N, a manufacture of Toa Electronics Ltd.).

Solvents treated to be purified

Solvent (1): In a glass tube of about 5 cm in diameter, aluminum oxide (a product of Wako Pure Chemical Industries, Ltd.) was packed with a height of about 10 cm (about 150 g), through which about 300 g of polyethylene glycol 200 (a product of Wako Pure Chemical Industries, Ltd.) was passed to be purified. The purified polyethylene glycol was free from the color formation ascribable to iodine, in a peroxide test according to the absorptiometric method, that is, the peroxide was removed. This is designated as Solvent (1).

Solvent (2): Triethylene glycol (a product of Kishida Chemical Co., Ltd.) was purified in the same manner as the above, which was designated as Solvent (2).

Solvent (3): Diethylene glycol (a product of Wako Pure Chemical Industries, Ltd.) was purified in the same manner as the above, which was designated as Solvent (3).

Solvent (4): Diethylene glycol monomethyl ether (a product of Wako Pure Chemical Industries, Ltd.) was purified in the same manner as the above, which was designated as Solvent (4).

Solvent (5): Thiodiglycol (a product of Wako Pure Chemical Industries, Ltd.) was purified in the same manner as the above, which was designated as Solvent (5).

EXAMPLE 1

| Ion exchanged water | 59 parts |
|---|---|
| Solvent (3) | 25 parts |
| Solvent (1) | 10 parts |
| C.I. Food Black 2 | 6 parts |

The above components were thoroughly mixed and dissolved in a container under a nitrogen gas atmosphere, followed by filtration under pressure by means of a filter made of Teflon (trademark) and having a pore diameter of 1 μm. Thereafter, nitrogen gas was further passed through the solution for 20 minutes to make Recording Liquid (1). No color formation ascribable to iodine was appeared and no peroxide was detected. The pH was found to be 7.1.

EXAMPLE 2

| Ion exchanged water | 58 parts |
|---|---|
| Solvent (2) | 15 parts |
| N-methyl-2-pyrrolidone | 20 parts |
| C.I. Acid Red 35 | 7 parts |

The above components were treated in the same procedures as described in Example 1 to make Recording Liquid (2). No peroxide was detected. The pH was found to be 6.5.

EXAMPLE 3

| Polyethylene glycol 200 | 57 parts |
|---|---|
| N-methyl-2-pyrrolidone | 43 parts |

The above were mixed, 33 parts of aluminum oxide was added to the mixture and then the mixture was stirred, followed by filtration to make Solvent (6). Then, 35 parts of Solvent (6), 57 parts of ion exchanged water and 8 parts of C.I. Direct Blue 199 were mixed and dissolved to make Recording Liquid (3). This had a peroxide concentration of 0.3 mmol/l. The pH was found to be 5.9.

EXAMPLE 4

| Ion exchanged water | 57 parts |
|---|---|
| Solvent (1) | 20 parts |
| N-methyl-2-pyrrolidone | 15 parts |
| C.I. Direct Yellow 86 | 8 parts |

The above components were treated in the same procedures as described in Example 1 to make Recording Liquid (4). Provided that the filling of nitrogen gas after filtration was not carried out. This liquid had a peroxide concentration of 0.08 mmol/l. The pH was found to be 6.7.

EXAMPLE 5

The components as described in Example 4 were thoroughly mixed and dissolved in a container under an air atmosphere, followed by filtration under pressure by means of a filter made of Teflon (trademark) and having a pore diameter of 1 μm. Thereafter, air was further passed through the solution for 1 hour to make Recording Liquid (5). This had a peroxide concentration of 1.9 mmol/l. The pH was found to be 5.4.

EXAMPLE 6

The components as described in Example 4 were thoroughly mixed and dissolved in a container under an air atmosphere, followed by filtration under pressure by means of a filter made of Teflon (trademark) and having a pore diameter of 1 μm. Thereafter, air was further passed through the solution for 3 hours to make Recording Liquid (6). This had a peroxide concentration of 3.8 mmol/l. The pH was found to be 4.5.

EXAMPLE 7

| Ion exchanged water | 63 parts |
|---|---|
| Solvent (4) | 10 parts |
| Solvent (5) | 10 parts |
| Ethanol | 10 parts |
| C.I. Food Black 2 | 7 parts |

The above components were thoroughly mixed and dissolved in a container, followed by filtration under pressure by means of a filter made of Teflon (trademark) and having a pore diameter of 1 μm to make Recording Liquid (7). No color formation ascribable to iodine was appeared and no peroxide was detected. The pH was found to be 6.8.

EXAMPLE 8

| Ion exchanged water | 77 parts |
|---|---|
| Solvent (4) | 15 parts |
| Ethanol | 5 parts |
| C.I. Food Black 2 | 3 parts |

The above components were thoroughly mixed under a nitrogen atmosphere, and thereafter anthraquinone was added in an amount of 0.1 part based on 100 parts of the above components, followed by filtration by means of a filter having a pore diameter of 1 μm to make Recording Liquid (8). No peroxide was detected. The pH was found to be 5.5.

Evaluation of the recording liquids was carried out on four items of (1) a long-term storage stability under conditions of 70° C., (2) ejection stability, (3) ejection response, and (4) presence of deposits in the vicinity of the heat energy source. The evaluation was carried out using an ink-jet printer utilizing a heating element as the ink ejection energy source (ejection orifice size: 40×50 μm; size of heating element: 50×150 μm; number of ejection orifice: 24). Results obtained are shown in Table 1.

COMPARATIVE EXAMPLE 1

| Ion exchanged water | 59 parts |
|---|---|
| Diethylene glycol (untreated) | 25 parts |
| Polyethylene glycol 200 (untreated) | 10 parts |
| C.I. Food Black 2 | 6 parts |

The above components were thoroughly mixed and dissolved in a container, followed by filtration under pressure by means of a filter made of Teflon (trademark) and having a pore diameter of 1 μm to make Recording Liquid (9). This had a peroxide concentration of 5.1 mmol/l. The pH was found to be 4.1.

COMPARATIVE EXAMPLE 2

| Ion exchanged water | 58 parts |
| --- | --- |
| Triethylene glycol (untreated) | 15 parts |
| N-methyl-2-pyrrolidone | 20 parts |
| C.I. Acid Red 35 | 7 parts |

The above components were treated in the same procedures as described in Comparative Example 1 to make Recording Liquid (10). This had a peroxide concentration of 4.2 mmol/l. The pH was found to be 3.9.

COMPARATIVE EXAMPLE 3

| Ion exchanged water | 57 parts |
| --- | --- |
| Polyethylene glycol 200 (untreated) | 20 parts |
| N-methyl-2-pyrrolidone | 20 parts |
| C.I. Direct Blue 199 | 8 parts |

The above components were treated in the same procedures as described in Comparative Example 1 to make Recording Liquid (11). This had a peroxide concentration of 5.9 mmol/l. The pH was found to be 3.7.

The same evaluation as Examples was made also on the recording solutions of Comparative Examples 1 to 3. Results obtained are shown in Table 1.

Evaluation method (1) Long-term storage stability of recording liquids:
Recording liquids were put in sealed glass containers, and stored at 70° C. for 30 days. Thereafter, recording liquids were checked whether insoluble matters were precipitated or not and color tone was changed or not, and also the properties of the recording liquids were examined.

(2) Ejection stability:
Using the recording liquids having been subjected to the test as described in the evaluation method (1), ejection was continuously carried out for 36 hours for each liquid.

(3) Ejection response:
After the recording liquids having been subjected to the test as described in the evaluation method (1) were left to stand for 20 hours and also for 1 month, and thereafter ejection tests were carried out.

(4) Presence of deposits in the vicinity of the heat energy source:
After the continuous ejection as described in evaluation method (2), the recording liquid ejecting part was disassembled to observe the presence of the deposits in the vicinity of the heat energy source by means of an optical microscope or an electron microscope.

Further, the ink absorbing layers in the ink-jet devices of FIG. 5 were impregnated with each of inks in the above-mentioned Examples 1-8, respectively, and then an ink-jet printer of FIG. 3 was loaded with each of the ink-jet devices to carry out the recording. Thereby, excellent recordings superior in the ejection properties could be carried out.

TABLE 1

| | Long-term storage stability | Ejection stability | Ejection response | Presence of deposits |
| --- | --- | --- | --- | --- |
| Example: | | | | |
| 1 | No precipitation of insoluble matter; no change in properties and color tone | Good stability | Good response | No deposit |
| 2 | No precipitation of insoluble matter; no change in properties and color tone | Good stability | Good response | " |
| 3 | No precipitation of insoluble matter; no change in properties and color tone | Good stability | Good response | " |
| 4 | No precipitation of insoluble matter; no change in properties and color tone | Good stability | Good response | " |
| 5 | No precipitation of insoluble matter; no change in properties and color tone | Good stability | Good response | " |
| 6 | No precipitation of insoluble matter; no change in properties and color tone | Good stability | Good response | Deposits a little |
| 7 | No precipitation of insoluble matter; no change in properties and color tone | Good stability | Good response | No deposit |
| 8 | No precipitation of insoluble matter; no change in properties and color tone | Good stability | Good response | " |
| Comparative Example: | | | | |
| 1 | No precipitation of insoluble matter; | Not ejected from 5/24 orifices in the course | Good response | Deposits present |

TABLE 1-continued

| | Long-term storage stability | Ejection stability | Ejection response | Presence of deposits |
|---|---|---|---|---|
| | viscosity slightly increased | | | |
| 2 | No precipitation of insoluble matter; viscosity slightly increased | Not ejected from 4/24 orifices in the course | Good response | Deposits present |
| 3 | No precipitation of insoluble matter; viscosity slightly increased | Not ejected from 8/24 orifices in the course | Good response | Deposits present |

The recording liquid of the present invention has a superior long-term storage stability, and moreover shows superior ejection stability and ejection response even when used in ink-jet printers that use heat energy as a droplet ejection source.

We claim:

1. A storage stable recording liquid suitable for use near a heat energy source in an ink-jet printer head comprising 0.5 to 15% by weight of a coloring material, and a liquid medium containing 10 to 95% by weight of water, and 5 to 95% by weight of a water-soluble organic solvent having an ether bond and subject to formation of deposits from peroxides derived from said ether bond, and a pH value of said recording liquid being from 3 to 9, wherein the peroxide concentration of said liquid medium is not more than 4 mmol/l in terms of iodine to suppress formation of said deposits.

2. The recording liquid according to claim 1, wherein said liquid medium has a peroxide concentration of not more than 3 mmol/l.

3. The recording liquid according to claim 1, wherein said liquid medium has a peroxide concentration of not more than 2 mmol/l.

4. The recording liquid according to claim 1, wherein said water-soluble organic solvent having an ether bond is a solvent selected from the group consisting of diethylene glycol, triethylene glycol, polyethylene glycol, and methyl or ethyl ether of any of those, thiodiglycol, and methyl or ethyl ether of ethylene glycol.

5. A storage stable recording liquid suitable for use near a heat energy source in an ink-jet printer head comprising 0.5 to 15% by weight of a coloring material, and a liquid medium containing 10 to 95% by weight of water, and 5 to 95% by weight of a water-soluble organic solvent having an ether bond and subject to formation of deposits from peroxides derived from said ether bond, and a pH value of said recording liquid being from 3 to 9, and a water-soluble dye having 2 or less amino groups being contained as a coloring material, wherein the peroxide concentration of said liquid medium is not more than 4 mmol/l in terms of iodine to suppress formation of said deposits.

6. The recording liquid according to claim 5, wherein said liquid medium has a peroxide concentration of not more than 3 mmol/l.

7. The recording liquid according to claim 5, wherein said liquid medium has a peroxide concentration of not more than 2 mmol/l.

8. The recording liquid according to claim 5, wherein said solvent having an ether bond is a solvent selected from the group consisting of diethylene glycol, triethylene glycol, polyethylene glycol, and methyl or ethyl ether of any of those, thiodiglycol, and methyl or ethyl ether of ethylene glycol.

9. An ink-jet recording process, which performs recording by ejecting droplets of a storage stable recording liquid, suitable for use near a heat energy source in an ink-jet printer head, from a minute ejection orifice to a recording medium by the action of heat energy, wherein said recording liquid comprises 0.5 to 15% by weight of a coloring material, and a liquid medium containing 10 to 95% by weight of water, and 5 to 95% by weight of a water-soluble organic solvent having an ether bond and subject to formation of deposits from peroxides derived from said ether bond, and a pH value of said recording liquid from 3 to 9, wherein the peroxide concentration of said liquid medium is not more than 4 mmol/l in terms of iodine to suppress formation of said deposits.

10. The ink-jet recording process according to claim 9, wherein said liquid medium has a peroxide concentration of not more than 3 mmol/l.

11. The ink-jet recording process according to claim 9, wherein said liquid medium has a peroxide concentration of not more than 2 mmol/l.

12. The ink-jet recording process according to claim 9, wherein said solvent having an ether bond is a solvent selected from the group consisting of diethylene glycol, triethylene glycol, polyethylene glycol, and methyl or ethyl ether of any of those, thiodiglycol, and methyl or ethyl ether of ethylene glycol.

13. The recording liquid according to claim 1, wherein the content of said water is 20–70% by weight.

14. The recording liquid according to claim 1, wherein the content of said organic solvent is 10–50% by weight.

15. The recording liquid according to claim 5, wherein the content of said water is 20–70% by weight.

16. The recording liquid according to claim 5, wherein the content of said organic solvent is 10–50% by weight.

17. The recording process according to claim 9, wherein the content of said water is 20–70% by weight.

18. The recording process according to claim 9, wherein the content of said organic solvent is 10–50% by weight.

19. The recording liquid according to claim 1, wherein the content of said water is 10 to 80% by weight.

20. The recording liquid according to claim 5, wherein the content of said water is 10 to 80% by weight.

21. The ink-jet recording process according to claim 9, wherein the content of said water is 10 to 80% by weight.

22. The recording liquid according to claim 1, wherein the content of said organic solvent is 10 to 80% by weight.

23. The recording liquid according to claim 5, wherein the content of said organic solvent is 10 to 80% by weight.

24. The ink-jet recording process according to claim 9, wherein the content of said organic solvent is 10 to 80% by weight.

25. The ink-jet recording process according to claim 9, wherein said water-soluble dye has 2 or less amino groups.

26. An ink-jet device comprising a recording liquid storing member stored with a recording liquid and a recording head having a plurality of orifices for ejecting the recording liquid as liquid droplets, wherein said recording liquid is a storage stable recording liquid suitable for use near a heat energy source in the recording head comprising 0.5 to 15% by weight of coloring material, a liquid medium containing 10 to 95% by weight of water, and 5 to 95% by weight of water-soluble organic solvent having an ether bond and subject to formation of deposits from peroxides derived from said ether bond, and a pH value of said recording liquid being from 3 to 9, wherein the peroxide concentration of said liquid medium is not more than 4 mmol/l in terms of iodine to suppress formation of said deposits.

27. An ink jet device according to claim 26, wherein said recording liquid storing member is an ink absorber or an ink bag.

28. An ink jet device according to claim 26, wherein said head has a heating head to provide to said ink a heat energy for ejecting an ink droplet.

29. An ink jet device according to claim 26, wherein said liquid medium has a peroxide concentration of not more than 3 mmol/l.

30. An ink jet device according to claim 26, wherein said liquid medium has a peroxide concentration of not more than 2 mmol/l.

31. An ink jet device according to claim 26, wherein said water-soluble organic solvent having an ether bond is a solvent selected from the group consisting of diethylene glycol, triethylene glycol, polyethylene glycol, and methyl or ethyl ether of any of those, thiodiglycol, and methyl or ethyl ether of ethylene glycol.

32. An ink jet device according to claim 26, wherein the content of said organic solvent is 10 to 80% by weight.

33. An ink jet device according to claim 26, wherein the content of said organic solvent is 10 to 50% by weight.

34. An ink jet device according to claim 26, wherein the content of said water is 10 to 80% by weight.

35. An ink jet device according to claim 26, wherein said water-soluble dye has 2 or less amino groups.

36. An ink-jet recording apparatus comprising an ink-jet device having a recording liquid storing member stored with a recording liquid and a recording head having a plurality of orifices for ejecting the recording liquid as liquid droplets, wherein said recording liquid is a storage stable recording liquid suitable for use near a heat energy source in the recording head comprising 0.5 to 15% by weight of coloring material, a liquid medium containing 10 to 95% by weight of water, and 5 to 95% by weight of water-soluble organic solvent having an ether bond and subject to formation of deposits from peroxides derived from said ether bond, and a pH value of said recording liquid being from 3 to 9, wherein the peroxide concentration of said liquid medium is not more than 4 mmol/l in terms of iodine to suppress formation of said deposits.

37. An ink-jet recording apparatus according to claim 36, wherein said recording storing liquid member is an ink absorber or an ink bag.

38. An ink-jet recording apparatus according to claim 36, wherein said head has a heating head to provide to said ink a heat energy for ejecting an ink droplet.

39. An ink-jet recording apparatus according to claim 36, wherein said liquid medium has a peroxide concentration of not more than 3 mmol/l.

40. An ink-jet recording apparatus according to claim 36, wherein said liquid medium has a peroxide concentration of not more than 2 mmol/l.

41. An ink-jet recording apparatus according to claim 36, wherein said water-soluble organic solvent having an ether bond is a solvent selected from the group consisting of diethylene glycol, triethylene glycol, polyethylene glycol, and methyl or ethyl ether of any of those, thiodiglycol, and methyl or ethyl ether of ethylene glycol.

42. An ink-jet recording apparatus according to claim 36, wherein the content of said organic solvent is 10 to 80% by weight.

43. An ink-jet recording apparatus according to claim 36, wherein the content of said organic solvent is 10 to 50% by weight.

44. An ink-jet recording apparatus according to claim 36, wherein the content of said water is 10 to 80% by weight.

45. An ink-jet recording apparatus according to claim 36, wherein said water-soluble dye has 2 or less amino groups.

46. An ink cartridge comprising a recording liquid storing member stored with a recording liquid, wherein said recording liquid is a storage stable recording liquid suitable for use near a heat energy source in a recording head comprising 0.5 to 15% by weight of coloring material, a liquid medium containing 10 to 95% by weight of water, and 5 to 95% by weight of water-soluble organic solvent having an ether bond and subject to formation of deposits from peroxides derived from said ether bond, and a pH value of said recording liquid being from 3 to 9, wherein the peroxide concentration of said liquid medium is not more than 4 mmol/l in terms of iodine to suppress formation of said deposits.

47. An ink cartridge according to claim 46, wherein said liquid medium has a peroxide concentration of not more than 3 mmol/l.

48. An ink cartridge according to claim 46, wherein said liquid medium has a peroxide concentration of not more than 2 mmol/l.

49. An ink cartridge according to claim 46, wherein said water-soluble organic solvent having an ether bond is a solvent selected from the group consisting of diethylene glycol, triethylene glycol, polyethylene glycol, and methyl or ethyl ether of any of those, thiodiglycol, and methyl or ethyl ether of ethylene glycol.

50. An ink cartridge according to claim 46, wherein the content of said organic solvent is 10 to 80% by weight.

51. An ink cartridge according to claim 46, wherein the content of said organic solvent is 10 to 50% by weight.

52. An ink cartridge according to claim 46, wherein the content of said water is 10 to 80% by weight.

53. An ink cartridge according to claim 46, wherein said water-soluble dye has 2 or less amino groups.

54. An ink-jet recording apparatus comprising a recording head having a plurality of orifices for ejecting a recording liquid as liquid droplets, an ink cartridge having a recording liquid storing member stored with the recording liquid, and a recording liquid supplying member for supplying the recording liquid from the ink cartridge to the recording head, wherein said recording liquid is a storage stable recording liquid suitable for use near a heat energy source in the recording head comprising 0.5 to 15% by weight of coloring material, a liquid medium containing 10 to 95% by weight of water, and 5 to 95% by weight of water-soluble organic solvent having an ether bond and subject to formation of deposits from peroxides derived from said ether bond, and a pH value of said recording liquid being from 3 to 9, wherein the peroxide concentration of said liquid medium is not more than 4 mmol/l in terms of iodine to suppress formation of said deposits.

55. An ink-jet recording apparatus according to claim 54, wherein said head has a heating head to provide to said recording liquid a heat energy for ejecting a liquid droplet.

56. An ink-jet recording apparatus according to claim 54, wherein said liquid medium has a peroxide concentration of not more than 3 mmol/l.

57. An ink-jet recording apparatus according to claim 54, wherein said liquid medium has a peroxide concentration of not more than 2 mmol/l.

58. An ink-jet recording apparatus according to claim 54, wherein said water-soluble organic solvent having an ether bond is a solvent selected from the group consisting of diethylene glycol, triethylene glycol, polyethylene glycol, and methyl or ethyl ether of any of those, thiodiglycol, and methyl or ethyl ether of ethylene glycol.

59. An ink-jet recording apparatus according to claim 54, wherein the content of said organic solvent is 10 to 80% by weight.

60. An ink-jet recording apparatus according to claim 54, wherein the content of said organic solvent is 10 to 50% by weight.

61. An ink-jet recording apparatus according to claim 54, wherein the content of said water is 10 to 80% by weight.

62. An ink-jet recording apparatus according to claim 54, wherein said coloring material has 2 or less amino groups.

* * * * *

UNITED STATES PATENT AND TRADEMARK OFFICE
CERTIFICATE OF CORRECTION

PATENT NO. : 5,059,246

DATED : October 22, 1991

INVENTOR(S) : Takao Yamamoto et al.

It is certified that error appears in the above-identified patent and that said Letters Patent is hereby corrected as shown below:

On the Title Page:

[56] References Cited:

Under "U.S. PATENT DOCUMENTS" heading,

"Onta et al." should read --Ohta et al.--.

COLUMN 2:

Line 27, "deposits," should read --deposits--.

COLUMN 6:

Line 18, "a" should read --in--.

COLUMN 9:

Line 16, "was" should be deleted.

Line 43, "0.3 mmol/l:" should read --0.3 mmol/l.--.

UNITED STATES PATENT AND TRADEMARK OFFICE
CERTIFICATE OF CORRECTION

PATENT NO. : 5,059,246

DATED : October 22, 1991

INVENTOR(S) : Takao Yamamoto et al.

It is certified that error appears in the above-identified patent and that said Letters Patent is hereby corrected as shown below:

COLUMN 10:

Line 26, "was" should be deleted.

Line 52, "orifice: 24)." should read --orifices: 24).--.

COLUMN 15:

Line 67, "recording storing liquid member" should read --recording liquid storing member--.

Signed and Sealed this

Sixth Day of April, 1993

Attest:

STEPHEN G. KUNIN

*Attesting Officer*    *Acting Commissioner of Patents and Trademarks*